United States Patent [19]

Rode

[11] Patent Number: 5,539,667
[45] Date of Patent: Jul. 23, 1996

[54] METHOD AND APPARATUS FOR IMPROVED DIGITAL FILM RECORDER

[75] Inventor: Christian S. Rode, Waltham, Mass.

[73] Assignee: GCC Technologies, Bedford, Mass.

[21] Appl. No.: 945,120

[22] Filed: Sep. 15, 1992

[51] Int. Cl.⁶ .................................................. G06T 5/00
[52] U.S. Cl. ........................................ 364/525; 395/128
[58] Field of Search ................................ 364/525, 526, 364/514, 517; 395/128, 131, 132; 345/147

[56] References Cited

U.S. PATENT DOCUMENTS

| | | | |
|---|---|---|---|
| 2,960,019 | 11/1960 | Craig . | |
| 3,881,098 | 4/1975 | Rich | 235/151 |
| 3,984,187 | 10/1976 | Bestenreiner et al. | 355/80 |
| 4,134,668 | 1/1979 | Coburn | 355/3 R |
| 4,457,618 | 7/1984 | Plummer | 355/20 |
| 4,654,721 | 3/1987 | Goertzel et al. | 358/283 |
| 4,668,995 | 5/1987 | Chen et al. | 358/282 |
| 4,701,045 | 10/1987 | Plummer | 355/20 |
| 4,712,909 | 12/1987 | Oshikoshi | 355/20 |
| 4,723,166 | 2/1988 | Stratton | 358/167 |
| 4,739,374 | 4/1988 | Mead et al. | 355/67 |
| 4,764,807 | 8/1988 | Kimura et al. | 358/75 |
| 4,849,809 | 7/1989 | Thara et al. | 358/75 |
| 4,855,940 | 8/1989 | Richardson et al. | 364/526 |
| 4,891,714 | 1/1990 | Klees | 358/456 |
| 4,903,068 | 2/1990 | Shiota | 355/20 |
| 4,930,018 | 5/1990 | Chan et al. | 358/298 |
| 4,941,013 | 7/1990 | Hara | 355/20 |
| 4,947,204 | 8/1990 | Endo | 355/20 |
| 4,958,238 | 9/1990 | Katayama et al. | 358/456 |
| 4,962,542 | 10/1990 | Klees | 382/54 |
| 4,969,052 | 11/1990 | Ishida et al. | 358/457 |
| 4,972,189 | 11/1990 | Polito et al. | 341/118 |
| 4,975,786 | 12/1990 | Katayama et al. | 358/459 |
| 4,996,530 | 2/1991 | Hilton | 341/120 |
| 5,014,333 | 5/1991 | Miller et al | 382/54 |
| 5,016,040 | 5/1991 | Dwyer, III | 355/20 |
| 5,031,050 | 7/1991 | Chan | 358/298 |
| 5,034,990 | 7/1991 | Klees | 382/22 |
| 5,036,398 | 7/1991 | Westell | 358/214 |
| 5,045,952 | 9/1991 | Eschbach | 358/447 |
| 5,050,000 | 9/1991 | Ng | 358/298 |
| 5,051,841 | 9/1991 | Bowers wt al. | 358/447 |
| 5,051,844 | 9/1991 | Sullivan | 358/456 |
| 5,060,284 | 10/1991 | Klees | 382/53 |
| 5,070,515 | 12/1991 | Iwahashi et al. | 375/27 |

OTHER PUBLICATIONS

Foley & VanDam–Fundamentals of Interactive Computer Graphics 1982 Edition–pp. 597–602.
Foley & VanDam–Fundamentals of Interactive Computer Graphics 1990–Second Edition–pp. 572–573.
Pratt–Digital Image Processing–pp. 616–625 1978–CH–22, Digital Point Processing Image Coding.

*Primary Examiner*—Ellis B. Ramirez
*Assistant Examiner*—Edward Pipala
*Attorney, Agent, or Firm*—Robin Diane Goldstein

[57] ABSTRACT

The invention discloses a method and apparatus for an improved digital film recorder. The improved recorder is capable of quantizing and recording high resolution images, in order to reduce recording time, without adding, or displaying appreciable quantization error artifacts. An image processor is provided which takes an image value at a select one of M input levels and quantizes the image value down to a select one of N output levels where M>N. The image processor of the invention then generates an error value which is related to the deviation between an idealized input signal and the quantized output signal. This error signal is then added back into the next input signal in order to smooth, or diffuse the error across a large area. Finally, in order to further reduce visible artifacts associated with the repetitive errors accompanying image areas having little or no change in image value, noise may be intentionally injected in order to break up any "bunching" of errors.

19 Claims, 16 Drawing Sheets

FIG. 5a

```
1   /* Error diffusion algorithm
2   /* Copyright 1991, 1992 GCC Technologies, Inc. */
3
4   /* GLOBALS */
5   int       bits_out = 5;         /* The number of bits the algorithm will quantize to */
6   Boolean   add_noise = FALSE;    /* Whether dithering noise is added before quantizing */
7
8   #define COMPUTATIONALLY_EFFICIENT
9
10  /* "noise_generator" is a function that returns 16 bits of "pseudorandom" noise.
11  /* Pseudorandom noise is not truly random but simulates the properties of randomness in
12  /* certain limited ways.  It is important to note that the noise repeats after a time.
13  /* Only the lower bits are used by the actual processing algorithm, "process_bits", but
14  /* a 16-bit noise generator generates noise that repeats after 65535 counts which
15  /* is not within several lines of a fairly large (4096 pixel/line) image.
16  /* This noise is generated by a linear feedback shift register (LFSR).
17  /* The polynomial used for the LFSR in this example is (X16+X15+X2+1)
18  */
19
20  int    noise_state = 1;
21
22  int    noise_generator(void);
23  int    noise_generator()
24  {
25      int   temp;
26
27      if (!noise_state) noise_state=1;
28      noise_state = (noise_state << 1) |
29          (( ((noise_state&0x8000) != 0) ^ ((noise_state&0x4000) != 0) ^
30             ((noise_state&0x0002) != 0) ^ ((noise_state&0x0001) != 0) ) ? 1:0);
```

FIG. 5b

```
31        return noise_state;
32    }
33
34    /* "power" is simply an integer function that returns the value of "base" raised to "exponent" */
35    long power(int,int);
36    long power(base,exponent)
37    {
38        long power_out = 1;
39
40        if (exponent) while (exponent--) power_out *= base;
41
42        return(power_out);
43    }
44
45    /* "process_bits" is a function that implements an exemplary error diffusion + noise algorithm.
46    /* It is shown here as it would be implemented on a Macintosh using a Macintosh style
47    /* pixmap which has 32-bit pixels arranged in row-major order.  There
48    /* is one important caveat, however.  Any extraneous pixels between each row or column
49    /* must be zeroed so as not to interfere with the diffusion process.  This requires an
50    /* unusual extra step on the Macintosh.  A film recorder implementation would most likely
51    /* not have these extra pixels.
52    /*
53    /* The 32-bit pixels are divided into 4 8-bit color components.  Undefined,
54    /* Red, Green and Blue.  The component color planes are thus 1 byte apart and
55    /* interleaved.  The algorithm processes a color plane as a unit, then returns to the
56    /* beginning to process the next plane.  The undefined plane is not processed. */
```

FIG. 5c

```
61  process_bits(GWorldPtr gw);
62  process_bits(gw)
63  GWorldPtr gw;
64  {
65      int     color;                              /* The color plane being processed */
66      int     QUANTIZE = ~(power(2,8-bits_out)-1);  /* QUANTIZE is a mask used to remove the least
67                                                      /* significant bits of the scaled pixel */
68      int     ROUND = power(2,7-bits_out);        /* ROUND adds one-half of the output's least
69                                                      /* significant bit before QUANTIZE is applied
70                                                      /* in order to round the value. */
71      int     save_state = noise_state;           /* It is important that the added noise be
72                                                      /* constant between planes so no "color speckles"
73                                                      /* appear. */
74
75  /* PROCESS EACH COLOR PLANE */
76      for (color = 1; color < 4; color++)
77      {
78          register unsigned char  *pix;           /* A pointer to the current pixel */
79          register long           pix_length;     /* The number of pixels to process in this plane */
80          register int            temp, error = 0; /* error is the running diffused error which is fed
81                                                      /* to the next pixel. */
82
83  /* The following functions are Macintosh-specific. They would be otherwise passed to this routine
84  /* or globally available in a film-recorder implementation */
85
86          pix = (unsigned char *) GetPixBaseAddr(GetGWorldPixMap(gw));
87          pix_length = GetHandleSize(RecoverHandle(pix))/4;
88          pix += color;
89
90          noise_state = save_state;               /* Make sure the pseudorandom noise is
```

FIG. 5d

```
91
92                                              identical in all three planes */
93   /* PROCESS EACH PIXEL IN THE PLANE */
94   /* There are two algorithms represented here, one a straightforward implementation and the
95    * other an algorithm that demonstrates what can be done without multiplication which is
96    * typically an expensive (in silicon or time) operation.  The second way is designated
97    * COMPUTATIONALLY_EFFICIENT.  Also note that this algorithm generates an even power-of-2
98    * number of levels for output. */
99
100       while (pix_length--)
101       {
102
103   /* Produce diffused, noisified, quantized but unclipped output.
104    * (Note that the noise equals noise_generator()-ROUND: instead of adding a bipolar
105    * noise and then a separate ROUND term, the two are combined in a single operation.
106    * Ordinarily the ROUND term would be added AFTER scaling, but this would mean that the
107    * noise_generator would have to be changed and a separate ROUND term added later.  In
108    * practice there is no important visual difference and an extra step is saved this way.)
109    */
110
111   #ifdef COMPUTATIONALLY_EFFICIENT
112
113           if (add_noise)                      /* add_noise is a global that turns additive noise
114                                                * on and off */
115               temp = ((int) *pix) + error + (noise_generator() & ~QUANTIZE);
116           else
117               temp = ((int) *pix) + error + ROUND;
118
119   /* x - (x>>bits_out) is an approximation for scaling by (QUANTIZE&0xFF)/255
120    * Note that SCALE_UP(SCALE_DOWN(x))-x is usually zero, sometimes 1. */
```

FIG. 5e

```
121
122    #define SCALE_DOWN(x)     ((x)-((x)>>bits_out))
123    #define SCALE_UP(x)       ((x)+((x)>>bits_out))
124
125                  temp = SCALE_DOWN(temp) & QUANTIZE;  /* Scale for 2^n output levels */
126         if (add_noise)
127              temp = *pix + error + (noise_generator() & ~QUANTIZE);
128         else
129              temp = *pix + error + ROUND;
130
131              temp = (temp * (QUANTIZE&0xFF))/255 & QUANTIZE;
132
133
134    #endif COMPUTATIONALLY_EFFICIENT
135
136    /* Clip "temp" to the valid output range */
137         if (temp > (int) (QUANTIZE&0xFF))         temp = (QUANTIZE&0xFF);
138         else if (temp < 0)                         temp = 0;
139                                          Figure 5c
140    /* Compute new cumulative "error".  This error is not the difference between the
141    /* output and the input, but the output and the (input+previous_error)
142    /* Please note: "error" is scaled to the input space
143    */
144    #ifdef COMPUTATIONALLY_EFFICIENT
145              error = (*pix + error) - SCALE_UP(temp);
146    #else
147              error = (*pix + error) - temp * 255/(QUANTIZE&0xFF);
148    #endif COMPUTATIONALLY_EFFICIENT
149
150    /* MODIFICATION FOR DEMONSTRATION ON 8-BIT OUTPUT DEVICES:
```

FIG. 5f

```
151        SCALE temp BACK TO FIT IN A 256 LEVEL SPACE
152        This is not a strict part of the algorithm.  Usually the value would be left as is
153        or right-justified.  This is necessary for display on 8(24)-bit display devices.
154     */
155
156     #define    DEMO_256
157     #ifdefDEMO_256
158     #ifdefCOMPUTATIONALLY_EFFICIENT
159                     *pix = SCALE_UP(temp);
160     #else
161                     *pix = temp*255/(QUANTIZE&0xFF);
162     #endif     COMPUTATIONALLY_EFFICIENT
163     #else
164                     *pix = temp;
165     #endifDEMO_256
166
167     /* Advance the pointer to the next pixel */
168                     pix+=4;
169                 }
170             }
171         }
172     }
173
```

FIG. 6a

| INPUT<br>{1 of 256} | OUTPUT<br>{1 of 32} | ERROR | |
|---|---|---|---|
| . | . | . | |
| . | . | . | |
| . | . | . | |
| 261 | 31 (255) | +6 | ] |
| 260 | 31 (255) | +5 | ] |
| 259 | 31 (255) | +4 | ] Invalid Input Data |
| 258 | 31 (255) | +3 | ] (Too High) |
| 257 | 31 (255) | +2 | ] |
| 256 | 31 (255) | +1 | ] |

==========================================VALID UPPER INPUT LIMIT

| INPUT | OUTPUT | ERROR | |
|---|---|---|---|
| 255 | 31 (255) | 0 | No Correction Necessary |
| 254 | 31 (255) | -1 | |
| 253 | 31 (255) | -2 | |
| 252 | 31 (255) | -3 | |
| 251 | 31 (255) | -4 | |
| 250 | 30 (247) | +3 | |
| 249 | 30 (247) | +2 | |
| 248 | 30 (247) | +1 | |
| 247 | 30 (247) | 0 | No Correction Necessary |
| 246 | 30 (247) | -1 | |
| 245 | 30 (247) | -2 | |
| 244 | 30 (247) | -3 | |
| 243 | 30 (247) | -4 | |
| 242 | 29 (232) | +3 | |
| . | . | . | |
| . | . | . | |
| . | . | . | |
| 21 | 3 (24) | -3 | |
| 20 | 3 (24) | -4 | |
| 19 | 2 (16) | +3 | |
| 18 | 2 (16) | +2 | |
| 17 | 2 (16) | +1 | |
| 16 | 2 (16) | 0 | No Correction Necessary |
| 15 | 2 (16) | -1 | |
| 14 | 2 (16) | -2 | |
| 13 | 2 (16) | -3 | |
| 12 | 2 (16) | -4 | |
| 11 | 1 (8) | +3 | |
| 10 | 1 (8) | +2 | |
| 9 | 1 (8) | +1 | |
| 8 | 1 (8) | 0 | No Correction Necessary |

FIG. 6b

```
7           1  (8)       -1
6           1  (8)       -2
5           1  (8)       -3
4           1  (8)       -4
-------------------------------------------
3           0  (0)       +3
2           0  (0)       +2
1           0  (0)       +1
0           0  (0)        0   No Correction Necessary
==============================================VALID LOWER INPUT LIMIT
-1          0  (0)       -1  ]
-2          0  (0)       -2  ]
-3          0  (0)       -3  ] Invalid Input Data
-4          0  (0)       -4  ] (Too Low)
-5          0  (0)       -5  ]
 .           .            .
 .           .            .
```

| | | | | |
|---|---|---|---|---|
| 17 | 2 | (16) | +1 | |
| 16 | 2 | (16) | 0 | No Correction Necessary |
| 15 | 2 | (16) | -1 | |
| 14 | 2 | (16) | -2 | |
| 13 | 2 | (16) | -3 | |
| 12 | 2 | (16) | -4 | |
| 11 | 1 | (8) | +3 | |
| 10 | 1 | (8) | +2 | |
| 9 | 1 | (8) | +1 | |
| 8 | 1 | (8) | 0 | No Correction Necessary |

FIG. 7a

| STEADY STATE INPUT | LAST ERROR + CURRENT STEADY STATE INPUT | NEW ERROR | PROCESS OUTPUT |
|---|---|---|---|
| 11 | 11 | +3 | 1 (8) |
| 11 | 14 | -2 | 2 (16) |
| 11 | 9 | +1 | 1 (8) |
| 11 | 12 | -4 | 2 (16) |
| 11 | 7 | -1 | 1 (8) |
| 11 | 10 | +2 | 1 (8) |
| 11 | 13 | -3 | 2 (16) |
| 11 | 9 | 0 | 1 (8) |
| 11 | 11 | +3 | 1 (8) |
| . | . | . | . |
| . | . | . | . |
| . | . | . | . |

FIG. 7b

METHOD AND APPARATUS FOR IMPROVED DIGITAL FILM RECORDER

BACKGROUND OF THE INVENTION

This invention relates, generally, to the field of digital film recorders, and more particularly to an improved digital film recorder which may provide increased recording speed while minimizing the introduction of visible and undesirable artifacts associated with the recording of a quantized image.

In the fields of computers and electronics, a series of sophisticated tools have been developed which permit individuals to display and manipulate images on a personal computer or work station. In particular, a number of image scanners and other input devices have been developed which allow full-color, photographic-quality images to be incorporated into computer applications.

Along with such image scanners, new software packages have also been developed with which a user may generate, on a computer, full color images consisting of charts, graphics, and the like, which may then be incorporated into printed documents, viewed on a video display, or projected as a form of electronic slide show.

Improvements have also been made in the performance of color display devices. These new display systems have the capability to render electronic images recorded at resolutions of 1024×768 pixels or higher. By using software which can develop and process images in a 24-bit color space, these input and display systems allow users to work with images made up of over 16.7 million colors.

While much use may be made of such high resolution and high color density scanned and computer-generated images in association with high quality display devices, it is often desirable to transform such screen images into hard copy representations which may then be used or manipulated further using traditional photographic means. Positive prints and slides are two such examples of the kinds of hard copy output which are often desirable in commercial, professional and engineering environments. Therefore, to transfer and record the high quality images generated on a computer and displayed on its screen to a more permanent and fixed form, film recorders have been developed.

Early efforts at film recorders were often simple variations on the theme of pointing a camera at a cathode ray tube or other suitable display device and then taking a picture. However, film recorders have since been developed which are capable of producing a more accurate end product by assembling an image on photographic film in a digital manner. Such digital image manipulation and recording techniques provide more precise and repeatable control to the user and offer a system which can produce a more accurate and pleasing finished photographic product.

An example of one such digital film recorder is a device described in U.S. Pat. No. 4,855,940 issued to Thomas L. Richardson, et al. on Aug. 8, 1989 and assigned to the Polaroid Corporation of Cambridge, Mass.; the teachings of which are incorporated herein by reference. In the '940 patent, Richardson describes a method and apparatus for defining and photographing computer images using a photographic exposure adaptor and providing an interface between a computer having a CPU and a film printer. Unfortunately, the apparatus disclosed by Richardson suffers from a number of limitations which reduce its overall usefulness. These limitations and their solutions are the focus of the present invention.

In particular, as discussed in Richardson, a digital film recorder may produce an exposure on a plate of light-sensitive film of an image to be recorded by repeatedly scanning each line of the image, which is displayed on a cathode ray tube or other image-producing device. This repetitive scanning is accomplished with a beam which is modulated in a binary manner such that the cumulative exposure of the light sensitive film by the beam produces a gray scale image. More particularly, given a known film speed, in order to produce an image which is capable of resolving 256 gray levels, at least 256 scans must be performed, with at least one scan for each possible gray level. Assuming that each scan will take approximately 50 milliseconds to expose a line of linear film, the complete recording of a 640×480 pixel image made up of 256 grey levels will take almost half a minute. Using a similar scan rate, the same recording at a resolution of 2048×1366 pixels would take over a minute.

Extrapolating further to a color system, then, we find that if the recording of a color image having a color resolution of 8 bits per primary color is desired, at least 256 scans must be performed for each red, blue and green color component yielding a minimum of 768 scans in order to produce a fully exposed 24-bit color image. It is noted that although 24-bit color is not the same as continuous analog color, it is, in fact, accurate enough for all but the most critical work.

Therefore, based on the above assumptions, at an output resolution of 2048×1366 pixels, a recording will require over four minutes, which is far too long for high volume output. In actual practice more than 256 per color may be required, since most film, color or monochromatic, has non-linearities in the properties of each recording layer. In addition, to match the typically non-linear input space of the input image, additional corrections, such as "gamma corrections" will also often need to be made. There will, therefore, be the need to compensate for these non-linearities in the exposure process by exposing some levels more than once in order to get 256 levels of nearly linear output.

Since the total scanning time is a function of (1) the number of exposure levels multiplied by (2) the number of lines scanned divided by (3) the number of lines scanned per second, one way to speed up the scanning process is to reduce the number of exposure levels which are recorded by the film recorder. However, while reducing the number of exposure levels from 256 per color component (or 256 in total for a monochrome image) to a smaller number will result in a faster overall recording time, quantizing from an input of 256 levels, which requires eight bits of information, to an output of fewer levels will result in an increased quantization error, and the increased production of visual artifacts. In addition, since in practice more scans must be performed for each output level in order to properly expose the photographic film as well as to compensate for various non-linear qualities, such as the film or the image input space, the use of fewer scans will result in a photographic film which receives less total exposure and is not properly compensated for its non-linearities.

Therefore, it has been determined that the need exists for an improved method and apparatus for digital film recording which overcomes the above noted limitations and which provides for decreased scan times by reducing the number of scans required for each color component, as well as reducing the required scan rate, while significantly reducing the problems associated with image quantization and maintaining sufficient image illumination.

SUMMARY OF THE INVENTION

This invention discloses a method and apparatus for an improved film recorder. In general, it is recognized that while the recording of quantized "natural" images may produce visually acceptable results, the recording of quantized computer-generated images, such as those generated by presentation graphics programs, will entail the quantization of images with smoothly changing or unchanging image areas and boundaries. This is because such computer generated images tend to have more ramps and more saturated colors and more abrupt image transitions than natural images. Unfortunately, it has been noted that the resulting quantization of these unchanging, or smoothly changing areas and boundaries contribute to the production of visible errors, which substantially degrade the quality of any hard copy output.

Therefore, generally speaking, in accordance with the invention, a method and apparatus for improved digital film recording is provided which can accurately record a 24-bit color image (or 8-bit monochromatic image) using fewer bits for the recording of each color without adding or displaying appreciable image quantization artifacts and without suffering the attendant film exposure problems found in the prior art.

In one application of the invention, a 256-level, or 8-bit monochromatic, image is provided as an input to the invention. Quantization error, which is a measure of the deviation of the actual output from the idealized output, is then added to the next input signal. Finally, a random noise signal may be added to the input signal after the addition of the last error value, and this new combination may then be passed to the quantizing function. In one embodiment, the incoming signal is quantized to a 32-level output, with the five most significant bits of the input comprising the quantization output and the three least significant bits of the input indicating the aforenoted error data.

By using such an architecture, a 256-level input signal may be quantized to a 32-level output signal with the resulting quantization error being retained and used to more accurately quantize the signal. In addition, since the quantization of an unchanging or slightly changing input signal may result in visible and unwanted artifacts, a noise signal having an absolute magnitude which is preferably not greater than the maximum value of the truncated portion of the quantized input signal may be added to the input signal to diffuse and disperse any added quantization errors and to reduce unwanted visual artifacts in the output image due to repeating quantization error.

Finally, due to the reduced number of scans the reduction of illumination available to expose the light-sensitive film may be compensated for through the use of a faster film and/or a moderate increase in the modulated beam intensity.

Accordingly, it is an object of the invention to provide an improved apparatus for digital film recording which overcomes the limitations of the prior art.

It is another object of the invention to provide an improved method for digital film recording which overcomes the limitations of the prior art.

It is a further object of the invention to provide an improved method and apparatus for digital film recording which can record digital images using quantization while minimizing or eliminating the recording of excessive image artifacts.

It is still another object of the invention to provide an improved method and apparatus for digital film recording in which quantization errors are diffused to render them less visible.

It is still a further object of the invention to provide an improved method and apparatus for digital film recording whereby a random level of noise not exceeding a predetermined value is added to a signal to be recorded in order to distribute quantization errors across at least a portion of the output signal and lessen their visual impact.

It is still an additional object of the invention to provide an improved method and apparatus for digital film recording which employs the diffusion of quantization errors and the use of added noise.

It is yet another object of the invention to provide an improved method and apparatus for digital film recording which may record color images at a speed which is faster than that allowed by traditional recording methods while reducing or eliminating any newly-introduced associated data quantization errors.

It is even another object of the invention to provide an improved method and apparatus for digital film recording which may compensate for the decreased exposure provided to a photographic film due to a decrease in the total number of scans.

It is yet a further object of the invention to provide an improved method and apparatus for digital film recording which may employ the process of scanning a CRT for the purpose of recording an image, wherein the scanning rate may be reduced in order to permit the employment of a simpler and less expensive CRT.

It is even a further object of the invention to provide an improved method and apparatus for digital film recording which is inexpensive and easy to assemble.

Still other objects and advantages of the invention will, in part, be obvious and will, in part, be apparent from the specification.

The invention accordingly comprises the features of construction, combinations of elements and arrangement of parts which will be exemplified in the detailed descriptions hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings in which:

FIGS. 5a, 5b, 5c, 5d, 5e and 5f, read together, illustrate an embodiment of the process of the instant invention implemented in the computer language C;

FIGS. 6a and 6b, combine to form a chart illustrating input signals, output signals and error signals provided in accordance with one embodiment of the instant invention;

FIG. 7a is an enlarged section of the chart of FIGS. 6a and 6b;

FIG. 7b is a chart illustrating output signals and error signals when the input signal is at a steady state;

NOTATION AND NOMENCLATURE

The detailed description that follows is presented largely in terms of algorithms and symbolic representations of operations on data bits and data structures within a computer memory. These algorithmic descriptions and representations are the means used by those skilled in the data processing arts to most effectively convey in substance their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE PREFERRED EMBODIMENTS

Figure 1:
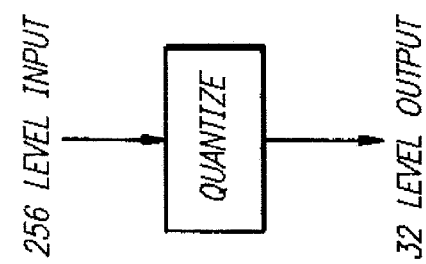
FIG. 1 is a block diagram illustrating the quantization of an input signal at one of 256 levels to an output signal at one of 32 levels with resulting artifacts.
Figure 8:
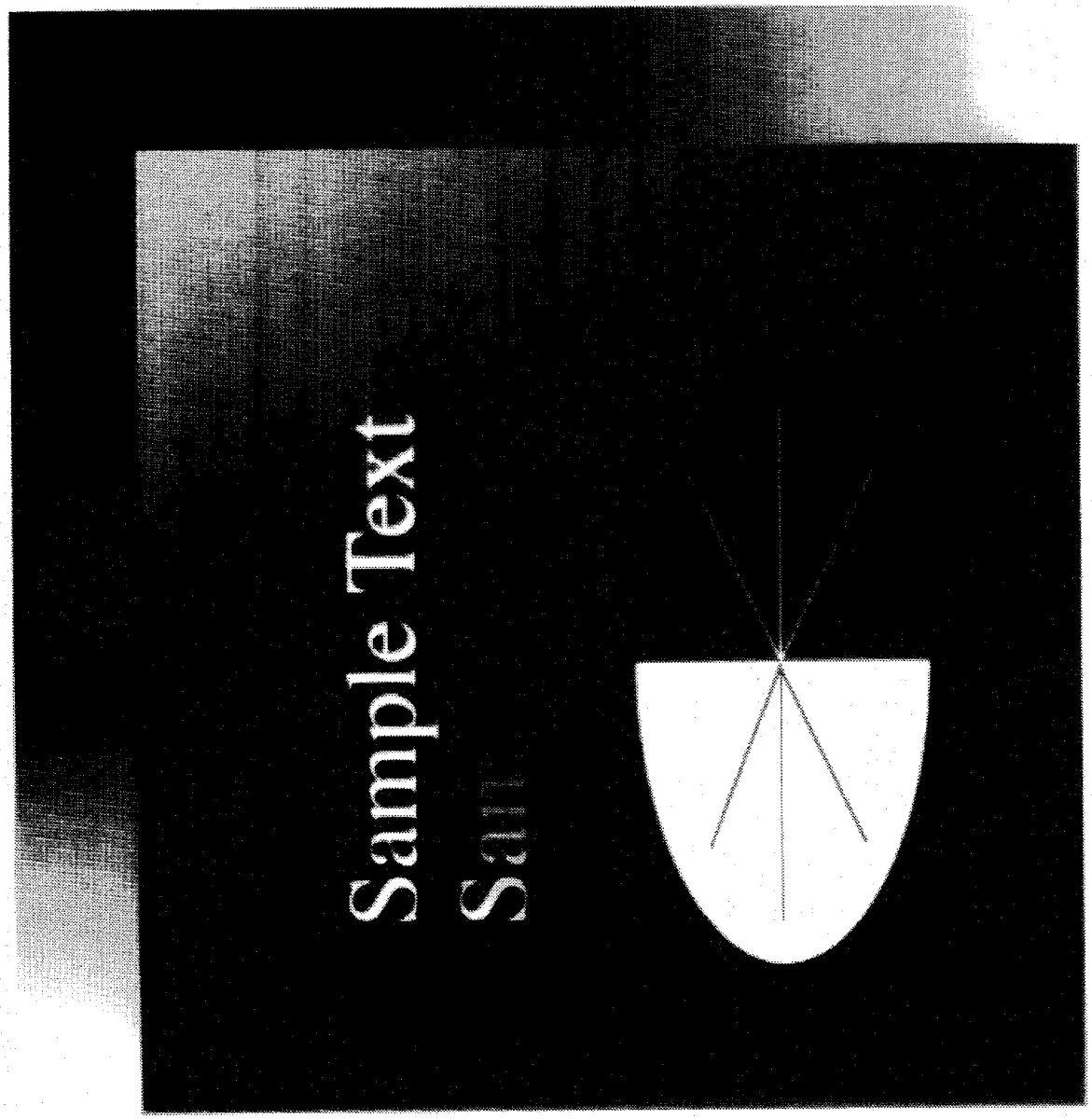
FIG. 8 is an image recorded at 256 grey levels.

Referring to FIG. 1, a simplified block diagram of the quantization of an input signal at one of 256 levels (such as a point in the image of FIG. 8) to an output signal at one of 32 levels (such as the same point in the image of FIG. 9) is shown. For the purposes of describing the instant invention, it is assumed that the input to the system is a signal which may be represented as being at one of 256 levels. In a binary system, this input signal may, therefore, be represented by an eight bit value. Further, if the input signal represents 8-bits of resolution of a single color, then using the well-known RGB (red, green, blue) color model, eight bits of red, eight bits of green, and eight bits of blue color information may each be represented, resulting in a 24 bit color space which may define over sixteen million colors.

It is noted that in the description of the present invention, the output signal is defined to be at one of 32 levels. However, it is recognized that the input signal may be quantized to an output signal having any number of levels, such as 16 or 64. In addition, it is also recognized that while the embodiment of the invention in the instant application is described as quantizing an image from 256 levels to 32 levels, quantizing from an input signal of 256 levels to an output signal of 33 levels will allow the invention to be practiced using a simple and a computationally efficient algorithm, resulting in an improved apparatus which may be easily and inexpensively manufactured.

Returning to FIG. 1, as can be seen (and as can also be observed in FIG. 8 and FIG. 9,) if an input signal at one of 256 levels is quantized to an output signal at one of 32 levels, then (depending on the nature of the input signal), it is very likely that visual information contained in the input signal will be lost and the resulting quantized output signal will be a "coarse" or "chunky" representation of the input signal. This is because the process of quantization is a process which sorts input data into a "best fit" output data channel. Therefore, in quantizing from an input signal at one of 256 levels to an output signal at one of 32 levels, only some inputs will map perfectly to an output channel. However, most inputs will not map perfectly, but will map approximately to an output data channel with some positive or negative deviation or error. This error, derived from the conversion of a signal at one of 256 levels to one of 32 levels is known as quantization error. In practice, this quantization error may or may not be objectionable depending upon a number of factors including the nature and level of the input signal over a period and whether or not the quantization of the input signal causes multiple, but different, input signals to "bunch up" or overlap into the same output channel. If such "overlapping" occurs frequently, the result will be a quantized output signal which contains visible artifacts. These artifacts are well known in the image processing area and appear in FIG. 9.

Figure 2:
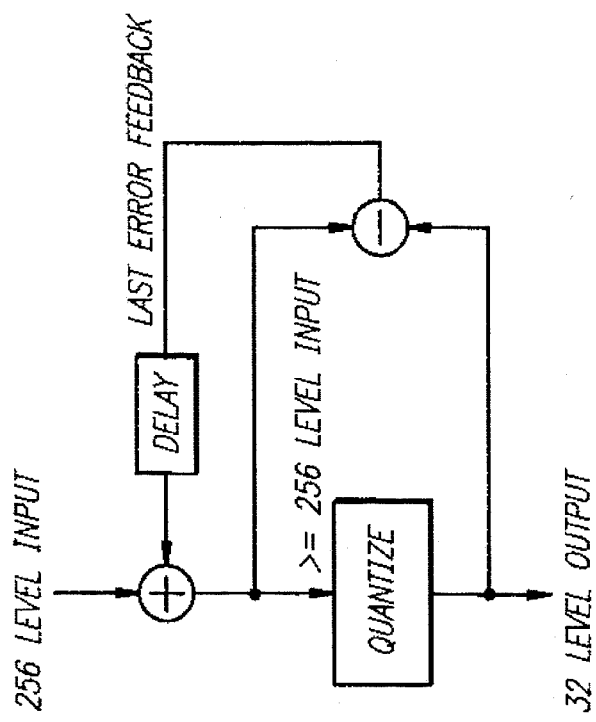
FIG. 2 is a block diagram illustrating the quantization of an input signal at one of 256 levels to an output signal at one of 32 levels, wherein the quantization error output is added to the next of said input signals.
Figure 9:
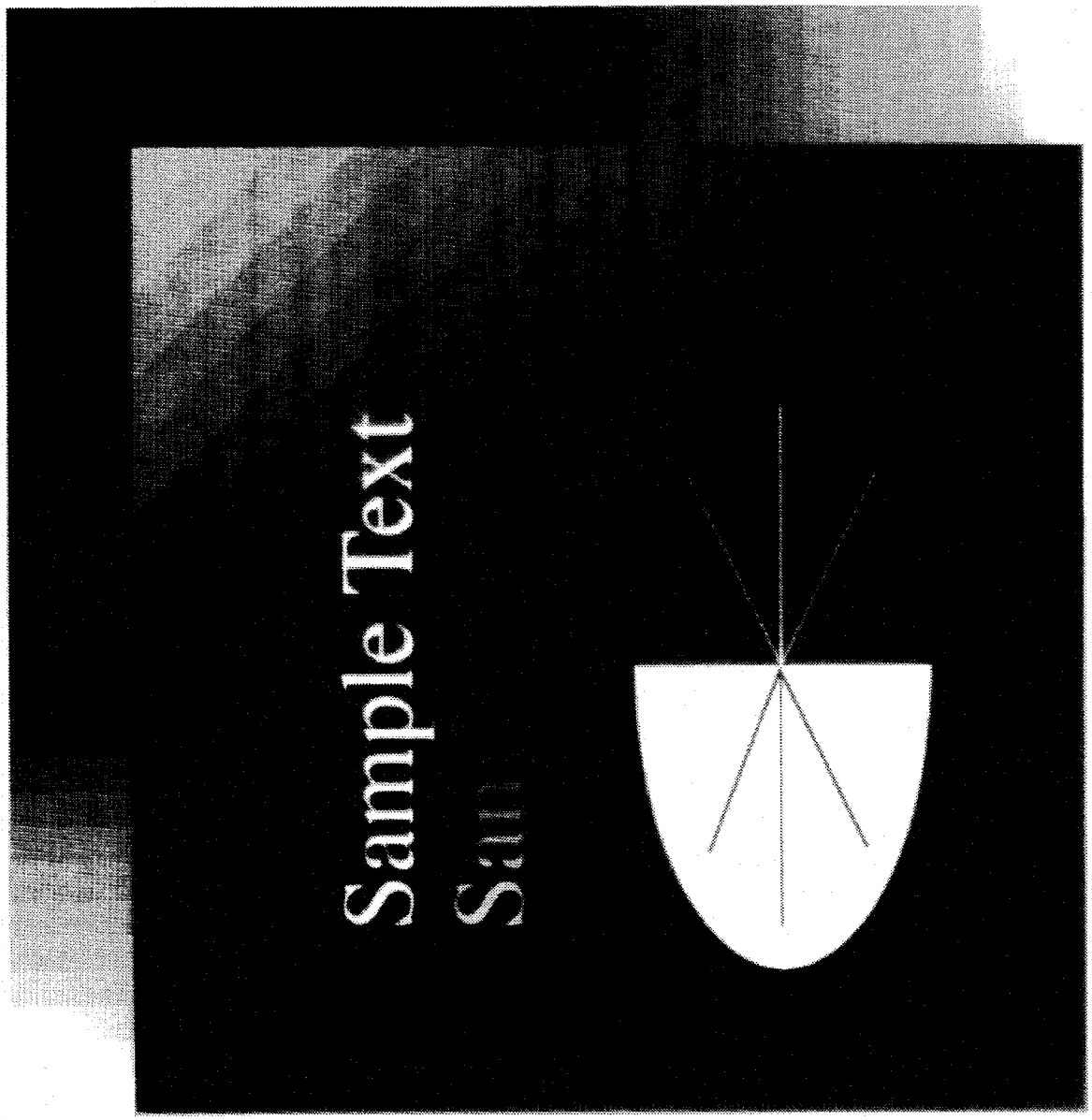
FIG. 9 is an image recorded at 256 grey levels and quantized to 32 grey levels.
Figure 10:
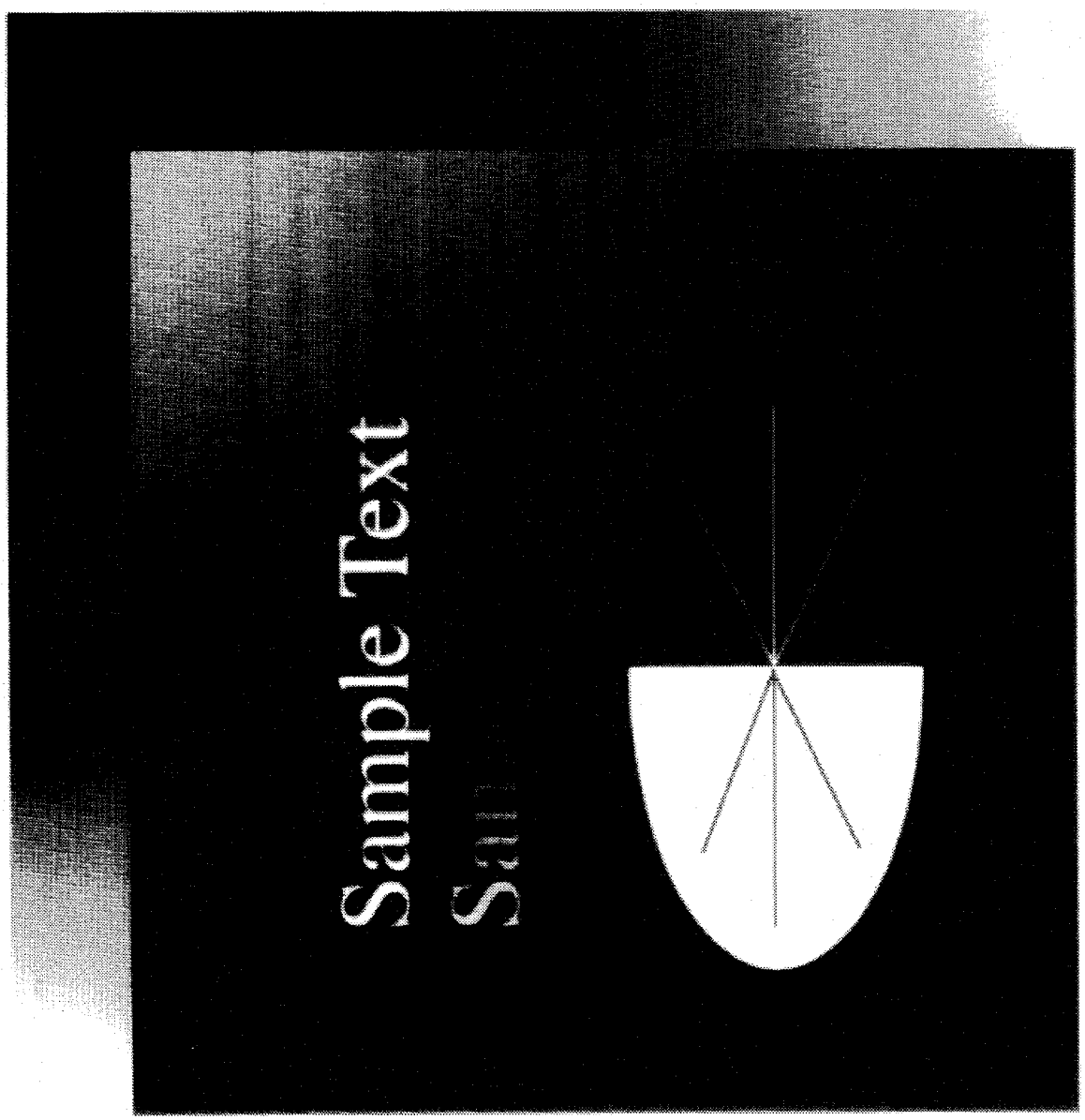
FIG. 10 is an image recorded at 256 grey levels and quantized to 32 grey levels wherein the quantization error is diffused.

Referring, then, to FIG. 2, a quantization process employing error diffusion is shown. This process is quite similar to the process shown in FIG. 1 except that the output of the quantization processor is compared to the input signal to arrive at a difference, or error signal. An image created in accordance with the process of FIG. 2 is shown in FIG. 10. As discussed earlier, if we imagine that the 32 possible output levels of the quantization processor can be represented by the five most significant bits of the 8-bit input signal, then the error signal may be understood, in one embodiment, to be indicated by the least significant three bits of the input signal which are not otherwise output from the quantization process. These three least significant bits represent the error, or missing resolution information, which is not available in the output of the quantization process. As can be seen by comparing FIG. 9 to FIG. 10, by adding the resulting quantization error from the instant quantization process to the next input signal, the output error will be diffused, across the input signal space. This, in turn, will help to reduce those boundary or quantization errors which are otherwise recognizable as visual artifacts.

However, while this error diffusion process is helpful in reducing the "channeling" or "banding" associated with image quantization, it is not always a wholly satisfactory solution in the processing of certain types of computer generated graphic information especially the type generated by presentation graphics computer programs. This is because, under certain circumstances, when an input signal remains fairly constant over an extended period of time, if the quantization error which is generated is added to the next input signal, it will propagate in a repeating fashion, thereby generating further visible artifacts. Experience has shown that such artifacts are especially noticeable in those areas of an image where there is little change in the input signal, such as areas having long unbroken boundaries, or areas of long monotonic ramps. In these situations, the use of the quantization error signal fed back and combined with the input signal is less helpful than it otherwise would be since, although the quantization errors will be spread over a large area, the actual error diffusion pattern will be observable as an objectionable artifact. As noted, this is especially true for computer generated images which tend to be "perfect" with well defined and regular image areas and borders, as opposed to "natural" images which are inherently noisy or which are typically generated by noisy devices. The effect may be seen in FIG. 10, wherein repetitive error diffusion patterns may be observed along the boundaries between adjacent but different output levels.

Referring now to FIGS. 6a and 6b, a table is provided which shows the relationship of an input to the quantization processor, such as the kind which might be used with the instant invention, to the output, including the management of errors associated with quantization overflow, so that the artifacts associated with error diffusion may be better understood. In the table of FIGS. 6a and 6b, the input to the system will be at one of 256 levels while the output will be at one of 32 levels. Depending upon the processing of the output signal, it may be quantized to a value of between 0 and 31 or, if desired, it may be quantized and scaled to fit within the same range of values as the 256 level input signal. Therefore, in the OUTPUT column of FIGS. 6a and 6b, both non-scaled (0–31) and scaled (0–255) quantized outputs are shown. The ERROR column shows the difference between the INPUT and the scaled output.

As noted above, in a typical quantization processor, the input signal may have a value ranging from a white saturation level of 0 to a black saturation level of 255. In addition, although it is anticipated that the input may be limited to keep it from having a value which is lower than 0 and higher than 255, the processor is designed to allow the input to fall outside this range without deleterious effect. In operation, inputs having a value from 0 through 3 are mapped to an output of 0 (0) while inputs having a value from 251 through 255 are mapped to an output of 31 (255). These two output levels of 0 (0) and 31 (255) define the limits of the processor output. In between these input limits of 0 through 3 and 251 through 255, inputs to the processor in the range of 4 through 250, in increments of approximately 8, will each increase the output by 1 (8). For example, when the input ranges between 4 and 11 the output will be 1 (8). When the input ranges between 12 and 19, the output will be 2 (16), and so on.

In addition to the overall scaling, it is also desirable that the error output of the quantization processor be centered in approximately the middle of each output channel range, with the exception of an output of 0 (0), which will always have a non-negative error and an output of 31 (255), which will always have a non-positive error, so that the quantization of an input idealized signal in the center of a quantization band will result in no error output. This output and error scaling can be easily seen though the use of an example in which the input ranges from 4 and 11. In such an example, the output will always be 1 (8), while the quantization error will range between an error of +3 for an input of 11; an error of –4 for an input of 4; and an error of 0 for an input of 8.

By using such a system, quantization errors, which as noted above are added back into the input data stream, provide a method for more faithfully converting the overall image from input to output. Therefore, while inputs of between 4 and 11 will always result in a quantization process output of 1 (8), the associated quantization error output will range between –4 and +3 thereby affecting subsequent inputs (and in turn, outputs) by tending to move cumulative inputs which are at the upper end of a quantization output band to the next higher output and those at the lower end to the next lower output.

However, as discussed above, if the input signal remains constant for even a small period of time, then secondary quantization artifacts may appear. Referring to FIG. 7a and 7b, by way of example, it can be seen that if an input signal is supplied having a value of 11, which is near the high side of quantization output 1 (8), then the quantization output will take a value of 1 (8) while the quantization error output will take a value of +3. If the next input signal again has a value of 11, then, according to the error diffusion process shown in FIG. 2, the actual input to the quantization process will have a value of 14, which is equal to the input signal of 11 plus the previous quantization error of +3. This will result in the process output having a value of 2 (16), with an associated quantization error output of –2. This, in turn, will be added to the next input signal, once again having a value of 11, which will bring the value of the actual input to the quantization processor to 9, which will result in a process output having a value of 1 with an associated quantization error output +1, and so on.

Unfortunately, as can be seen in FIG. 7b, in the preceding example if the input remains at a steady state for 8 inputs or more, a highly likely condition for computer generated images, then the error output signal will begin to repeat and become visibly apparent. Therefore, an alternative method is necessary to diffuse steady state inputs to a quantization processor.

Figure 3:
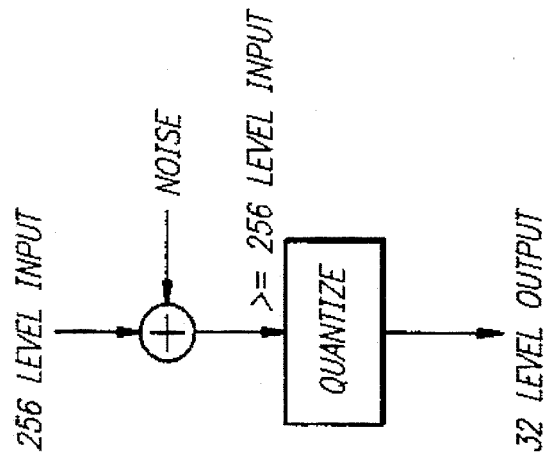
FIG. 3 is a block diagram illustrating the quantization of an input signal at one of 256 levels to an output signal at one of 32 levels, wherein noise is added to the input signal.
Figure 11:
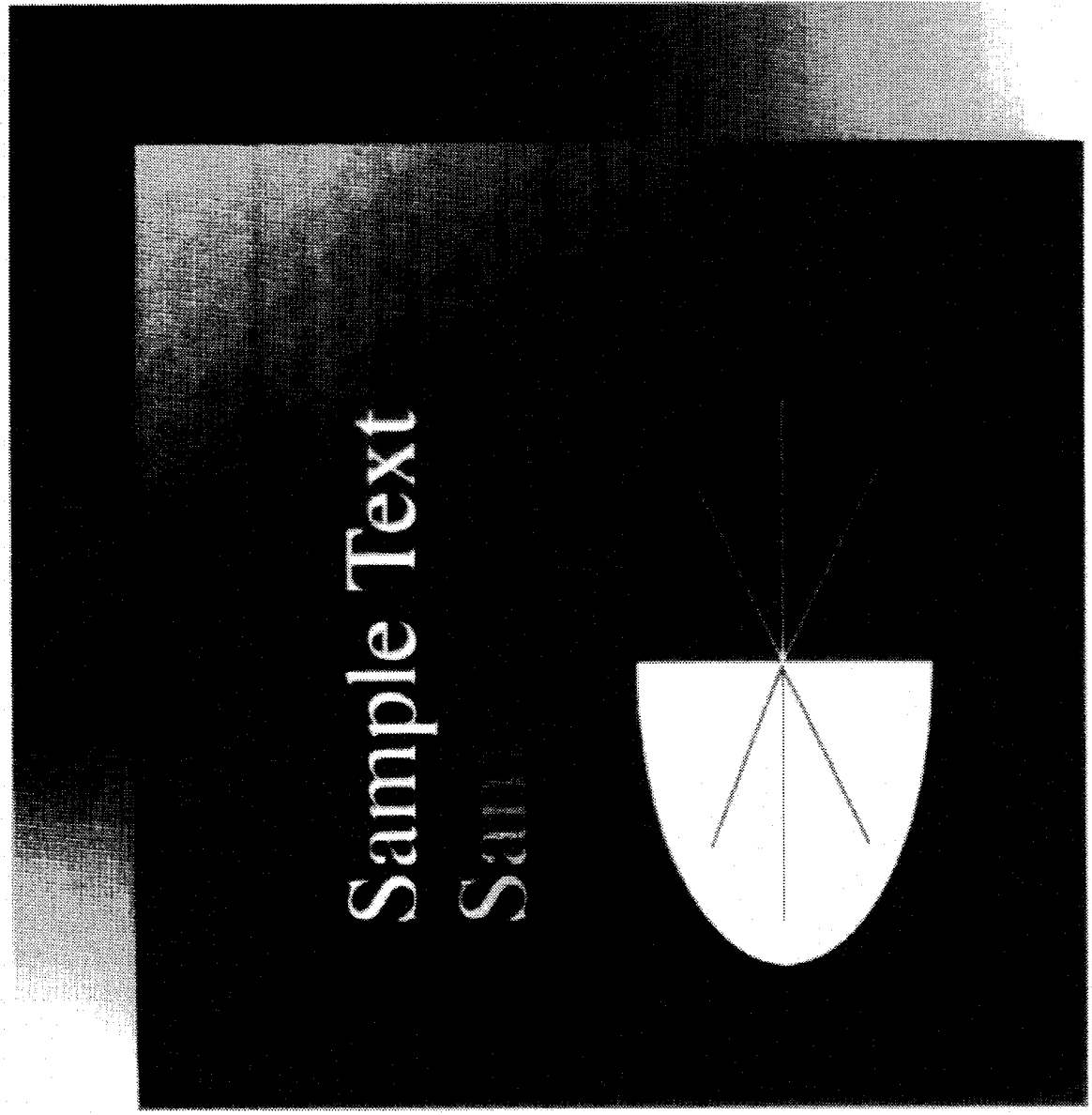
FIG. 11 is an image recorded at 256 grey levels and quantized to 32 grey levels wherein noise is added to the image.

One alternate method of diffusing such steady state inputs is to combine the input with some small amount of noise before it is provided to quantization processor. Such a process is shown in FIG. 3, and the output of a quantized image made in accordance with the process of FIG. 3 is provided in FIG. 11. As can be seen in comparing the simply quantized image of FIG. 9 to the "noise enhanced" quantized image of FIG. 11, the addition of noise to the input signal will, indeed, help to break up the bunching associated with a single input value over an extended period. In FIG. 11, it can been seen that the clearly identifiable quantization bands of FIG. 9 are diminished as a small amount of noise is added to the input signal prior to quantization. Clearly, the amount of noise added to the input signal will determine the effectiveness of the process shown in FIG. 3. If, for example, too little noise is added (i.e. 1 part in 256), then, depending on the content of the image, the diffusion provided by the additional noise might not be enough to visibly reduce unwanted artifacts. On the other hand, if enough noise is added to the input signal, it would be possible to completely obscure the input to the point where no recognizable image was produced. Therefore, the appropriate amount of noise to be added in order to diffuse quantization error must be determined for each image based on the contents of the image. Through research it has been determined that a noise signal ranging from zero to the maximum value of that part of the input signal which is truncated by the quantization process will often provide acceptable results.

However, whereas the error diffusion process illustrated in FIG. 2 and the addition of noise illustrated in FIG. 3 each provide some value in reducing image artifacts from a quantized image which is to be recorded by a digital film recorder, it has been determined that maximum benefit may be derived by combining the above two techniques.

Figure 4B:
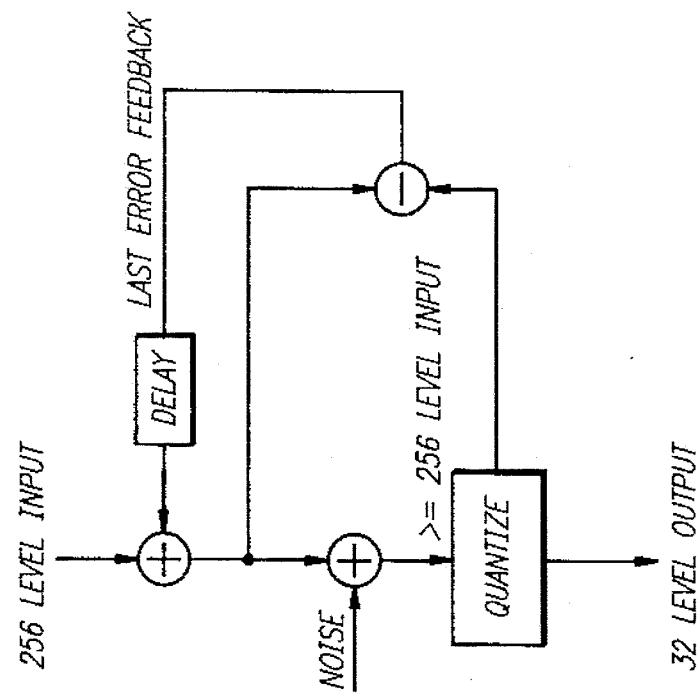
FIG. 4b is a block diagram illustrating an embodiment of the invention of FIG. 4a, wherein an input signal at one of 256 levels is quantized to an output signal at one of 32 levels.
Figure 4A:
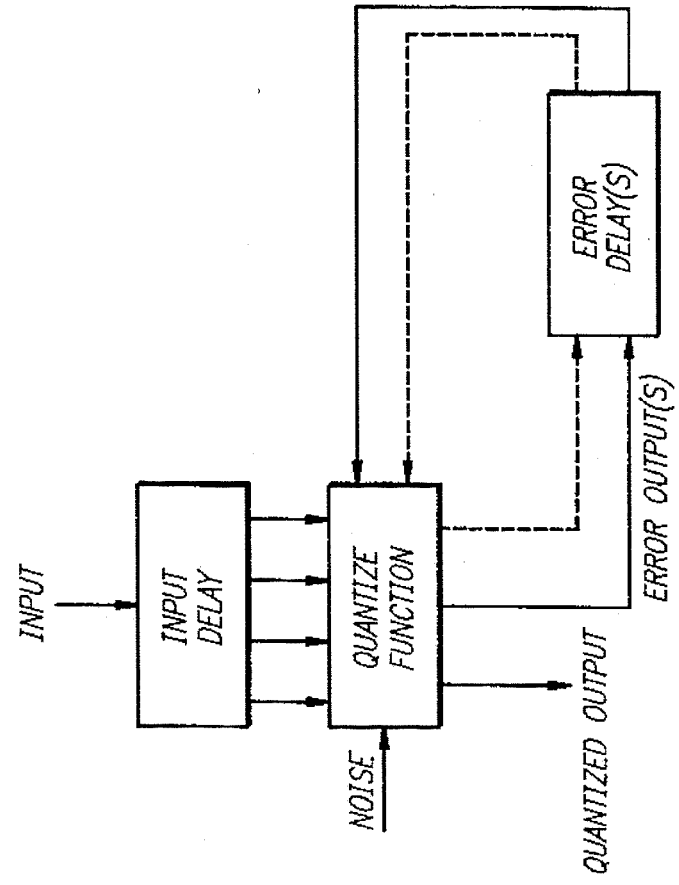
FIG. 4a is a block diagram illustrating the invention.

Therefore, turning to FIG. 4a, a block diagram illustrating the architecture of the present invention is provided. In the invention, an image input is provided to an input delay, which may comprise a digital filter. This filter is preferably of the type which may be modeled as a finite impulse response (FIR) filter. In such an FIR filter, the input is provided to an input delay line, which is comprised of multiple delay elements. Associated with each delay element is a tap, which may be assigned a weighted value. These weighted outputs are then summed into a summing node, which produces the output of the digital filter. In practice, by choosing appropriate tap weightings, any one of a number of filtering effects may be realized, including the implementation of a low pass filter, a high pass filter, or a band pass filter.

As shown, the output of any selected number of weighted delay taps are then provided as inputs to a quantization function. The quantization function produces a quantized output and at least one error output as a function of delayed input signals, a noise input and the feedback of a delayed quantization function error output. In practice what happens within the quantization function may be adjusted by modifying the parameters of the input delay, the noise input, and the error delay. However, the quantization function may be modeled as:

$$output_0 = f_Q(input_0, input_1, input_2, \ldots, error_1, error_2, \ldots, noise)$$

$$error_0 = f_{err}(input_0, input_1, input_2, \ldots, error_1, error_2, \ldots, noise)$$

where $output_0$ is the quantization output; $error_0$ is the quantization error output; $input_{0, 1\ and\ 2} \ldots$ are tap weighted inputs which may be in the form of delayed inputs; noise is random information preferably having a value within the signal input space; and $error_{1,2\ and\ 3} \ldots$ error outputs from other quantization steps.

By employing such a model, any n-dimensional model of the invention may be developed. By way of example, by using a model with two-dimensional quantization, multiple weighted tap inputs may be used so that $input_0$ may be the current pixel multiplied by 50% while $input_1$ may be a previous pixel to the left of $input_0$ multiplied by 25% and $input_2$ may be a previous pixel above $input_0$ multiplied by 25%. Another example of such weighting is the Floyd Steinberg algorithm where the concept of two-dimensional error diffusion is practiced by using ⅜ of a pixel to the right of the current pixel, ⅜ of a pixel below the current pixel and ⅔ of a pixel down and to the right of the current pixel. This weighting scheme can also be implemented in the present invention.

Figure 12:
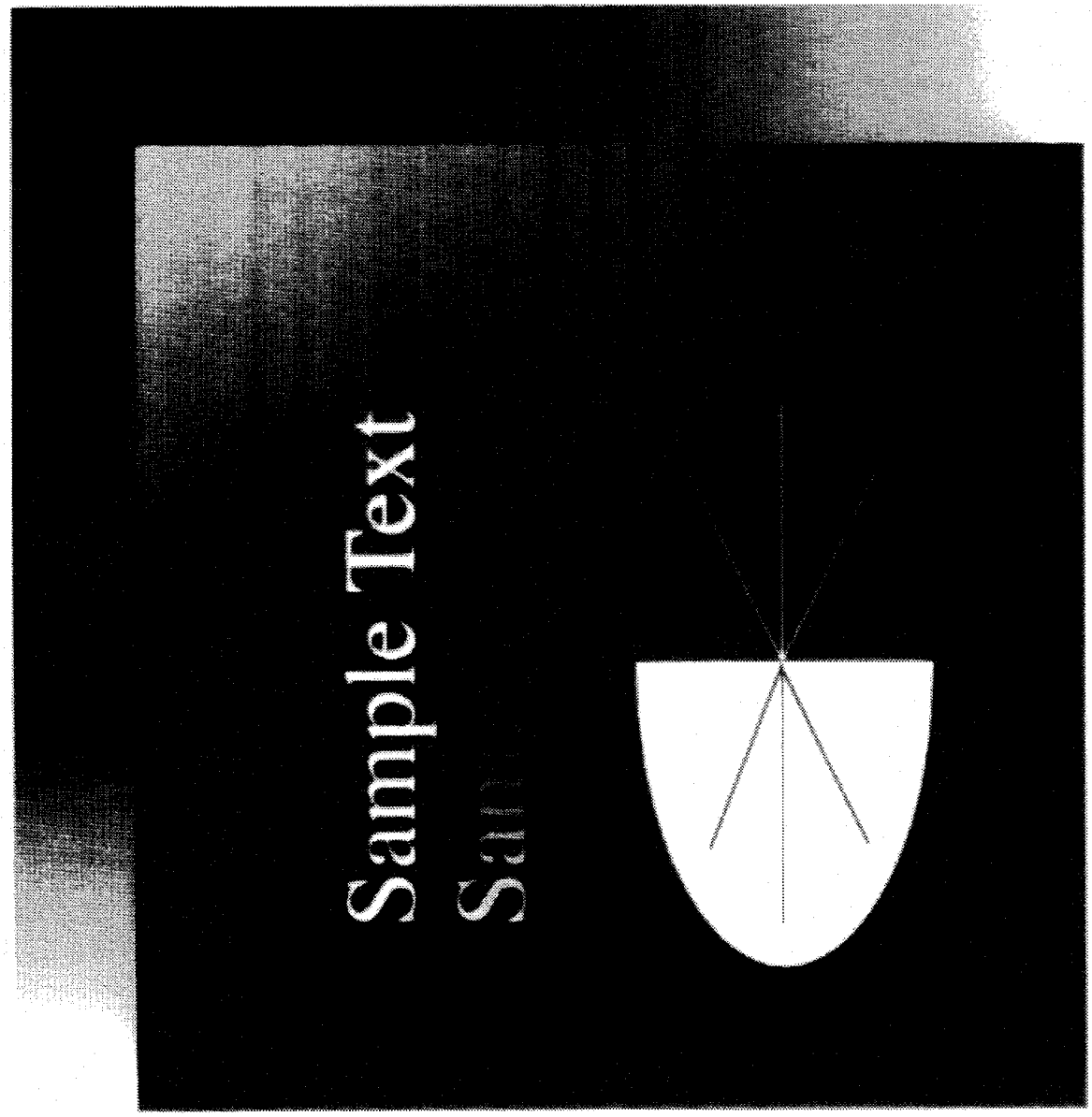
FIG. 12 is an image recorded at 256 grey levels and quantized to 32 grey levels wherein the quantization error is diffused and noise is added to the image.

Turning next to FIG. 4b, a block diagram of a specific implementation of the instant invention illustrated in FIG. 4a is shown in which the aforenoted limitations of quantization, and quantization coupled with error diffusion or quantization coupled with noise are significantly eliminated. The results of a process performed according to FIG. 4b are illustrated in FIG. 12.

The quantization function shown in FIG. 4b may be modeled as:

$$output_0 = Q(input_0 + error_1 + noise)$$

$$error_0 = input_0 + error_1 - output_0$$

where Q is the quantize or truncation operator.

Under the instant embodiment of the invention, an input signal representing a point in an image to be recorded, and at one of 256 levels, or eight bits, is provided. This input signal is then combined with the quantization error signal calculated and carried over from the last quantization process in a manner similar to that shown in FIG. 2, and described in detail above.

A noise signal is then added to this combination in a manner similar to that shown in FIG. 3, also as described above. As discussed earlier, while the noise signal may have any value, it may be readily understood that a noise signal with a large maximum value will unnecessarily obscure details present in the original input signal, while a noise signal with a small maximum value may not be sufficient to accomplish the results desired through the practice of the instant invention. Therefore, as noted, by experimentation, it has been determined that a noise signal having a maximum value no greater than the portion of the input signal which is truncated by the quantization process will provide the desired results.

By way of example, if our 256-level input signal can be represented in eight bits, and the quantization process will truncate the three least significant bits of the input signal to produce an output 32 level output signal which can be represented in five bits, then the noise signal should preferably have a maximum value which may be represented in no more than three bits. Using the two's complement numbering system, these three least significant bits will have an absolute value of between 0 and 7 or a two's complement value of between +3 and −4. In practice it is preferred to use the two's complement value, since it will allow the invention generated noise signal to be both positive and negative instead of residing totally in the positive or negative noise domain. This total combination is then quantized by the quantization processor which, once again, yields an output which may be at one of 32 levels. This 32 level output is then also compared to the present input before the addition of noise but after the addition of the previous error to arrive at a value which is representative of the deviation of the actual output signal from an idealized output signal had the 256 level input signal been perfectly converted to a 32 level value with no error.

Therefore, by employing the processes shown in FIG. 4a or FIG. 4b, and described above, a quantized output being at one of 32 levels may be provided in which the quantization error is not lost, but is fed back as an additional input to the quantization process in order to spread any quantization errors over a long period of input signals, and, further, where internally generated noise is also added to the input signal, in order to "break up" any "bunching" or overlapping of quantization error which may result from a slowly changing or steady state input signal.

Referring to FIGS. 5a, 5b, 5c, 5d, 5e and 5f, a computationally efficient algorithm implemented in the "C" computer language is shown which scales a 256 level input down to a 32 level output including the output of an error value, and which adds a noise signal to the input signal.

Thus, as can be seen, an improved method and apparatus for a digital film recorder may be provided which overcomes limitations of the prior art and which may be easily and inexpensively implemented. As a result, thereof, an image capable of being displayed at a high resolution and in color on a video display may be recorded on light sensitive film in an efficient and relatively rapid manner without adding or displaying appreciable quantization error artifacts.

It is appreciated that by using an implementation of the invention the recording film will receive less exposure than would otherwise be the case. However, it is recognized that such exposure deficiencies may be compensated for by using a film with a higher speed. While such higher speed film may have a grain pattern which is more noticeable, in fact through experimentation it has also been determined that the film grain even at higher speeds is still smaller than the grain of the phosphor on the recording CRT.

It is further appreciated that while the above described embodiment of the invention utilizes an image generation source which is coupled to a display, it is possible to generate computer images at resolutions which are higher than those displayable on such a display. In such a case the image generator may be connected only to the digital film recorder of the invention and no display used. Similarly, when such an image display is used, although it is, for the purposes of this invention, described as being of the traditional cathode ray tube variety, any suitable display technology, color or monochromatic, may be used. This is equally true for the recording CRT employed by the film recorder, where such recording CRT may also be capable of directly displaying a color or monochromatic image, and where such recording CRT may not be an actual CRT, but may utilize any alternate display technology, such as liquid crystal display technology.

It is also appreciated that while the specific example of a system having an input which may take a value of between 0 and 255 and a scaled output which may take a value of between 0 and 31 is shown by way of example, any other desired scaling function may also be implemented as desired. There is no limitation on the number of input levels or output levels or on the relationship between the input and output scaling under this invention. There is also no limitation on the scaling of the error output signal or its absolute relationship to either the input signal value or output signal value. In the example given in this application, it is desirable to maintain the value of the output between 0 and 31. This is done by establishing the scaling output to fall between 0 and 31 for any input, and by never allowing an output with a value of 0 to have a negative error and by never allowing an output with a value of 31 to have a positive error. However, this design choice may be easily modified according to the needs of the information which is being processed.

It is additionally appreciated that while conversion of the input signal to the output signal and the generation of intermediate error terms may be done with look-up tables, such a conversion may also be performed in a computationally efficient manner without look-up tables through the use of digital logic, devices such as programmable logic arrays, field programmable gate arrays, programmable logic devices or custom silicon.

It is appreciated, as well, that the use of a noise signal having a value which has an absolute value which does not exceed the absolute value of the least significant bits which have been truncated though the quantization process is merely a design choice and not rigidly required. It is understood that, depending upon the nature of the input signal, a smaller noise level may provide acceptable results and be sufficient to mask any repetitive quantization errors. It is also recognized that a sufficiently long repeating input string moderated by a relatively small noise amount may also yield some visible quantization artifacts so that in such a case the noise input will have to be increased.

With respect to the added noise of the invention, such noise is preferably inserted in the digital domain since the image processing itself takes place completely in the digital domain and thus no noise is inherent in the system. However, it is anticipated that analog components may be used which have an inherent noise element and that such inherent noise element may be combined with the input signal and the error signal in accordance with the teachings of the invention to mask quantization errors. It is also understood that the invention may be practiced without the use of the quantization error signal if the noise signal is large enough. Finally, it is anticipated that while the examples given above have been with reference to single color plane of a three color system, the invention will work equally well for a monochromatic system as for a full-color system which is composed of more than three color planes.

Additionally, it is noted that while for optimum masking results all noise added to an embodiment of the invention to be practiced in a multi-color system should be "random", in order to minimize the addition of color artifacts along with the introduction of noise, the noise which is added to each color plane during processing should be correlated. In this way, while the noise will be random across the image space, the noise will be consistent across the three color spaces. This desired result may be realized through the use of "pseudo-random" noise, or noise which may be repeated through the use of seed keys or other mechanism.

Finally, it is noted that while the invention disclosed above is discussed with respect to a linear input space and a linear output space, modifications such as input and output correction tables may be made to the quantization processor, the input delay processor, and the error delay processor to adjust for non-linear input and non-linear output spaces. Applied to FIG. 4a, this would mean that the quantization function can process a linear input space into a non-linear output space by keeping track of the closest match of the desired value from the input space, without reference to the actual quantization process, which produces the best fit to the output space. It would then save and feed back the linear error term as an addition to the next input.

Accordingly, it will thus be seen that the objects set forth above, among those made apparent from the preceding description, are efficiently attained and, since certain changes may be made in the above constructions without departing from the spirit and scope of the invention, it is intended that all of the matter contained in the above description or shown in the accompanying drawings, shall be interpreted as illustrative, and not in a limiting sense.

It will also be understood that the following claims are intended to cover all of the generic and specific features of the invention, herein described, and all statements of the scope of the invention which, as a matter of language, might be said to fall there between.

What is claimed is:

1. An improved digital film recorder, for use in recording an image present on an electronic display device to a photographic emulsion, the improvement comprising:

an improved digital film recorder mechanism;

interface means, comprising at least a first input and a first output, for receiving an image signal at said first input representative of a value of a portion of an image being displayed on a display device, said image signal being provided to said interface means first output at a select one of M values;

noise generation means for generating a noise signal;

first combination means for combining said image signal present at said first output of said interface means with the noise signal generated by said noise generation means and supplying the resulting combined signal to a first combination means output; and quantization means for quantizing the signal present at said first combination means output, said quantization means having at least a quantized output, the operation of said quantization means being such that said quantized output is at a select one of N values, where M>N;

wherein said improved digital film recorder mechanism records the image being displayed on said display device to a photographic emulsion by recording the quantized output combination of said image signal and said noise signal.

2. The improved digital film recorder, as claimed in claim 1, wherein said image signal comprises at least a luminance component and a chrominance component; said first combination means acting to combine only said luminance component of said image signal with said noise signal; and wherein said improved digital film recorder records the image being displayed on said display device to a photographic emulsion by recording the quantized output combination of said noise signal and the luminance component of said image signal.

3. The improved digital film recorder, as claimed in claim 1, wherein said noise signal is supplied as a digital noise signal capable of being at one of a multiplicity of values; and wherein said improved digital film recorder records the image being displayed on said display device to a photographic emulsion by recording the quantized output combination of said image signal and said digital noise signal.

4. The improved digital film recorder, as claimed in claim 3, wherein said image signal comprises data representative of a single color plane of a multi color image being displayed on said display device;

said digital noise signal being controllable such that the value of the digital noise signal applied to a same point of an image in each color plane of a multi color image is the same; and wherein said improved digital film recorder mechanism records a single color plane of the multi color image being displayed on said display device to a photographic emulsion by recording the quantized output combination of said image signal and said digital noise signal.

5. An improved digital film recorder, for use in recording an image, the improvement comprising:

an improved digital film recorder mechanism;

interface means, comprising at least a first input and a first output, for receiving an image signal representative of a value of a portion of an image being displayed on a display device, said image signal being at a select one of M values, said interface means further comprising an image delay means interposed between said first input and said first output for receiving and selectively storing said image signals;

noise generation means for generating a noise signal;

quantization means for quantizing said image signal, said quantization means comprising a first input coupled to the first output of said image input means, a second input for receiving said noise signal and a third input;

said quantization means further comprising a quantized output, the operation of said quantization means being such that said quantized output is at a select one of N values, where M>N;

said quantization means additionally comprising an error output for outputting an error signal, said error signal being representative of the deviation of said quantized output from said first input of said quantization means; and error delay means for receiving and storing said error signal, said error delay means comprising an error delay input coupled to said error output of said quantization means, said error delay means further comprising an error delay output for selectively providing said delayed error signal to the third input of said quantization means;

whereby the quantized output of said quantization means is effectively modified such that any repetitive quantization error is diminished; and wherein said improved digital film recorder mechanism records the image being displayed on said display device to a photographic emulsion by recording the quantized output combination of said image signal, said noise signal and said delayed error signal.

6. The improved digital film recorder, as claimed in claim 5, wherein said image signal comprises at least a luminance component and a chrominance component; said quantization means acting to combine only said luminance component of said input signal with said noise signal;

wherein said improved digital film recorder mechanism records the image being displayed on said display device to a photographic emulsion by recording the quantized output combination of the luminance component of said image signal, said noise signal and said delayed error signal.

7. The improved digital film recorder, as claimed in claim 5, wherein said noise signal is supplied as a digital noise signal; and wherein said improved digital film recorder mechanism records the image being displayed on said display device to a photographic emulsion by recording the quantized output combination of said image signal, said digital noise signal and said delayed error signal.

8. The improved digital film recorder, as claimed in claim 7, wherein said image signal represents the data contained in a single color plane of a multi color image capable of being displayed on said display device;

said digital noise signal being controllable such that the digital noise value applied to a same point of an image in each color plane is the same;

wherein said improved digital film recorder mechanism records a single color plane of the image being displayed on said display device to a photographic emulsion by recording the quantized output combination of said image signal and said digital noise signal.

9. The improved digital film recorder, as claimed in claim 5, wherein said image signal may be represented as a digital value X bits long.

10. The improved digital film recorder, as claimed in claim 9, wherein said quantized output from said quantization means may be represented as a digital value Y bits long.

11. The improved digital film recorder, as claimed in claim 10, wherein said quantized output from said quantization means comprises the Y most significant bits of said X bit long image signal.

12. The improved digital film recorder, as claimed in claim 10, wherein said error signal may be represented as a digital value comprising the X-Y least significant bits of said image signal.

13. The improved digital film recorder, as claimed in claim 9 wherein X=8.

14. The improved digital film recorder, as claimed in claim 10, wherein Y=5.

15. The improved digital film recorder, as claimed in claim 12, wherein said X-Y least significant bits represent a two's complement value.

16. An improved method for digitally recording an image on film, the improved method comprising the steps of:

receiving an image signal representative of a value of a portion of an image to be recorded, said input being at a select one of M values;

generating a noise signal;

combining said image signal with said noise signal;

quantizing the resulting combination of said image signal and said noise signal to a quantized output signal, such that said quantized output signal is at a select one of N values, where M>N; and recording said quantized output signal on to a photographic emulsion.

17. The improved method for digitally recording an image on film, as claimed in claim 16, wherein said noise signal is generated as a digital noise signal.

18. The improved method for digitally recording an image on film, as claimed in claim 17, wherein said image signal represents the data of a single color plane of a multi color image being displayed on a display device;

said digital noise signal being controllable such that the digital noise value applied to a same point of an image in each color plane is the same.

19. An improved digital film recorder, for use in recording an image, the improvement comprising:

an improved digital film recorder mechanism;

interface means, comprising at least a first input and a first output, for receiving an image signal at said first input, said image signal being representative of a value of a portion of an image being displayed on a display device, said image signal being supplied at a select one of M values at said first output;

noise generation means for generating a noise signal; and quantization means for quantizing said image signal, said quantization means comprising a noise input for receiving said noise signal and a first input coupled to the first output of said interface means and wherein said quantization means further comprises:

a quantized output, the operation of said quantization means being such that said quantized output is at a select one of N values, where M>N; and an error output for outputting at least an error signal, said error signal being representative of the deviation of the value of the signal at said quantized output from said value of the signal at the first input of said quantization means;

wherein said improved digital film recorder mechanism records the image being displayed on said display device to a photographic emulsion by recording the quantized output of said image signal and said noise signal.

* * * * *